(12) United States Patent
Kim et al.

(10) Patent No.: US 8,173,290 B2
(45) Date of Patent: May 8, 2012

(54) BATTERY PACK

(75) Inventors: Woochull Kim, Yongin-si (KR);
Heuisang Yoon, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 604 days.

(21) Appl. No.: 12/360,359

(22) Filed: Jan. 27, 2009

(65) Prior Publication Data

US 2009/0297934 A1 Dec. 3, 2009

(30) Foreign Application Priority Data

Jun. 3, 2008 (KR) .................. 10-2008-0052274

(51) Int. Cl.
*H01M 2/20* (2006.01)
(52) U.S. Cl. ........................ 429/121; 429/163
(58) Field of Classification Search .................. 429/163, 429/121
See application file for complete search history.

(56) References Cited

U.S. PATENT DOCUMENTS

| 6,556,122 | B2 * | 4/2003 | Izaki et al. ........... 337/405 |
| 7,541,771 | B1 * | 6/2009 | Leavitt et al. ........... 320/112 |
| 2002/0150815 | A1 * | 10/2002 | Ehara ................... 429/90 |
| 2004/0038122 | A1 * | 2/2004 | Hisamitsu et al. ........ 429/120 |
| 2005/0106454 | A1 * | 5/2005 | Kozu et al. ............. 429/175 |
| 2005/0221130 | A1 | 10/2005 | Yoon |
| 2006/0127755 | A1 | 6/2006 | Cho |
| 2007/0037058 | A1 * | 2/2007 | Visco et al. ............ 429/246 |
| 2007/0154784 | A1 * | 7/2007 | Seo .................... 429/61 |

FOREIGN PATENT DOCUMENTS

| KR | 10-2005-0077480 | 8/2005 |
| KR | 10-0537535 B1 | 12/2005 |
| KR | 10-0571272 B1 | 4/2006 |
| KR | 10-0614278 A | 11/2006 |
| KR | 10-2007-0074391 A | 7/2007 |
| KR | 10-2007-0097144 | 10/2007 |

OTHER PUBLICATIONS

Notice of Allowance dated Oct. 25, 2010 issued by the KIPO for corresponding Korean Patent Application No. 10-2008-0052274—5 pages.

* cited by examiner

*Primary Examiner* — Jane Rhee
(74) *Attorney, Agent, or Firm* — Knobbe Martens Olson & Bear LLP

(57) ABSTRACT

A battery pack including: a bare cell; a protection circuit module disposed on a first side of the bare cell; a connection member connected to the protection circuit module; and an adhesive unit to attach the connection member to the bare cell. The bare cell includes a rectangular can. The protection circuit module is disposed on a first side of the can and is electrically connected to a first electrode terminal of the bare cell that extends through the first side of the can. The protection circuit board is electrically connected to a second side of the can, by the connection member. The adhesive unit may be an adhesive tape or a conductive adhesive.

14 Claims, 6 Drawing Sheets

BATTERY PACK

CROSS-REFERENCE TO RELATED APPLICATION

This application is based on and claims priority to Korean Patent Application No. 2008-52274, filed on Jun. 3, 2008, in the Korean Intellectual Property Office, the disclosure of which is hereby incorporated by reference.

BACKGROUND OF THE INVENTION

1. Field of the Invention

Aspects of the present invention relate to a battery pack, and more particularly, to a battery pack having an improved electrical coupling between a bare cell and a protection circuit module.

2. Description of the Related Art

Recently, compact and lightweight portable electronic devices, such as cellular phones, notebook computers, camcorders, etc., have been actively developed and produced. Portable electronic devices include a battery pack as a portable power source. A battery pack generally includes one or more secondary batteries.

Secondary batteries include nickel-cadmium (Ni—Cd) batteries, nickel-metal hydride (Ni—MH) batteries, lithium (Li) batteries, lithium ion (Li-ion) batteries, etc. Lithium ion secondary batteries have an operating voltage that is three times that of nickel-cadmium (Ni—Cd) or nickel-metal hydride (Ni—MH) batteries. In addition, the lithium ion secondary batteries have a higher energy density per unit weight.

Lithium ion secondary batteries use a lithium oxide as a cathode active material and a carbonaceous material as an anode active material. A secondary battery can include a liquid electrolyte or a polymer electrolyte. A lithium ion battery uses a liquid electrolyte, and a lithium polymer battery uses a polymer electrolyte.

A secondary battery pack includes a bare cell and a protection circuit module coupled to the bare cell. The bare cell includes an electrode assembly, an electrolyte, and a can to house the electrode assembly and the electrolyte. The bare cell stores and discharges electricity through a reversible chemical reaction. The protection circuit module protects the bare cell, by preventing the overcharging and over discharging of the bare cell.

In a conventional battery pack, the bare cell and protection circuit module are electrically and mechanically coupled to each other. In other words, an electrode terminal and a lead plate of the protection circuit module are connected to each other by welding or soldering, and then the lead plate is welded or soldered to the electrode terminal of the bare cell.

Accordingly, the welding or soldering process is performed several times during the assembly of the bare cell and protection circuit module. Thus, the assembly process is time consuming and complicated. In particular, the welding or soldering process lacks the precision that is required for producing a slim battery pack.

SUMMARY OF THE INVENTION

Accordingly, an aspect of the present invention is to provide a battery pack that can be produced in a shorter time, without defects, by coupling a bare cell and a protection circuit without welding or soldering.

According to another aspect of the present invention, provided is a battery pack having improved reliability, because harmful materials, such as palladium, or mercury, are not used, because the battery pack is not welded or soldered.

According to an aspect of the present invention, there is provided a battery pack that includes: a bare cell; a protection circuit module; a connection member connected to the protection circuit module; and an adhesive unit to attach the connection member to the bare cell.

According to aspects of the present invention, the bare cell may include a roughly rectangular can, and the protection circuit module may be provided at a first side of the can. The protective circuit board can be connected to a first electrode terminal of the bare cell that extends through the first side of the can and can be connected to a second electrode terminal of the bare cell, by the connection member.

According to aspects of the present invention, the connection member may be attached to a second side of the can, which is used as a second electrode terminal of the bare cell.

According to aspects of the present invention, the connection member may be a FPCB (flexible printed circuit board).

According to aspects of the present invention, the FPCB may include a copper foil that is coated with an insulating film. An uncoated portion of the copper foil may be shaped into a leaf spring.

According to aspects of the present invention, the uncoated portion may be plated with gold, to enhance an electrical connection to the can and to prevent corrosion.

According to aspects of the present invention, the connection member may be a terminal plate. The terminal plate may be made of nickel.

According to aspects of the present invention, the can may be made of aluminum or an aluminum alloy, and the terminal plate may be made of aluminum.

According to aspects of the present invention, the can may be made of steel or stainless steel, and the terminal plate may be made of copper.

According to aspects of the present invention, the bare cell may include a rectangular can, and the protection circuit module may be provided at a shorter side of the can. The protection circuit module can be connected to the first electrode terminal and the second electrode terminal, by the connection member.

According to aspects of the present invention, the connection member may be attached to a side of the can.

According to aspects of the present invention, the connection member may be a terminal plate.

According to aspects of the present invention, the terminal plate may be made of nickel.

According to aspects of the present invention, the adhesive unit may be a conductive adhesive or an adhesive tape. The adhesive tape may be a polyimide tape.

According to aspects of the present invention, the protection circuit module may be combined to the bare cell by a top case.

According to aspects of the present invention, the bare cell may be surrounded by a label.

According to aspects of the present invention, a bottom case may be combined to a lower side of the bare cell.

BRIEF DESCRIPTION OF THE DRAWINGS

The above and other objects, features and advantages of the present invention will be more apparent from the following detailed description, taken in conjunction with the accompanying drawings, of which.

DETAILED DESCRIPTION OF THE EMBODIMENTS

Figure 1:
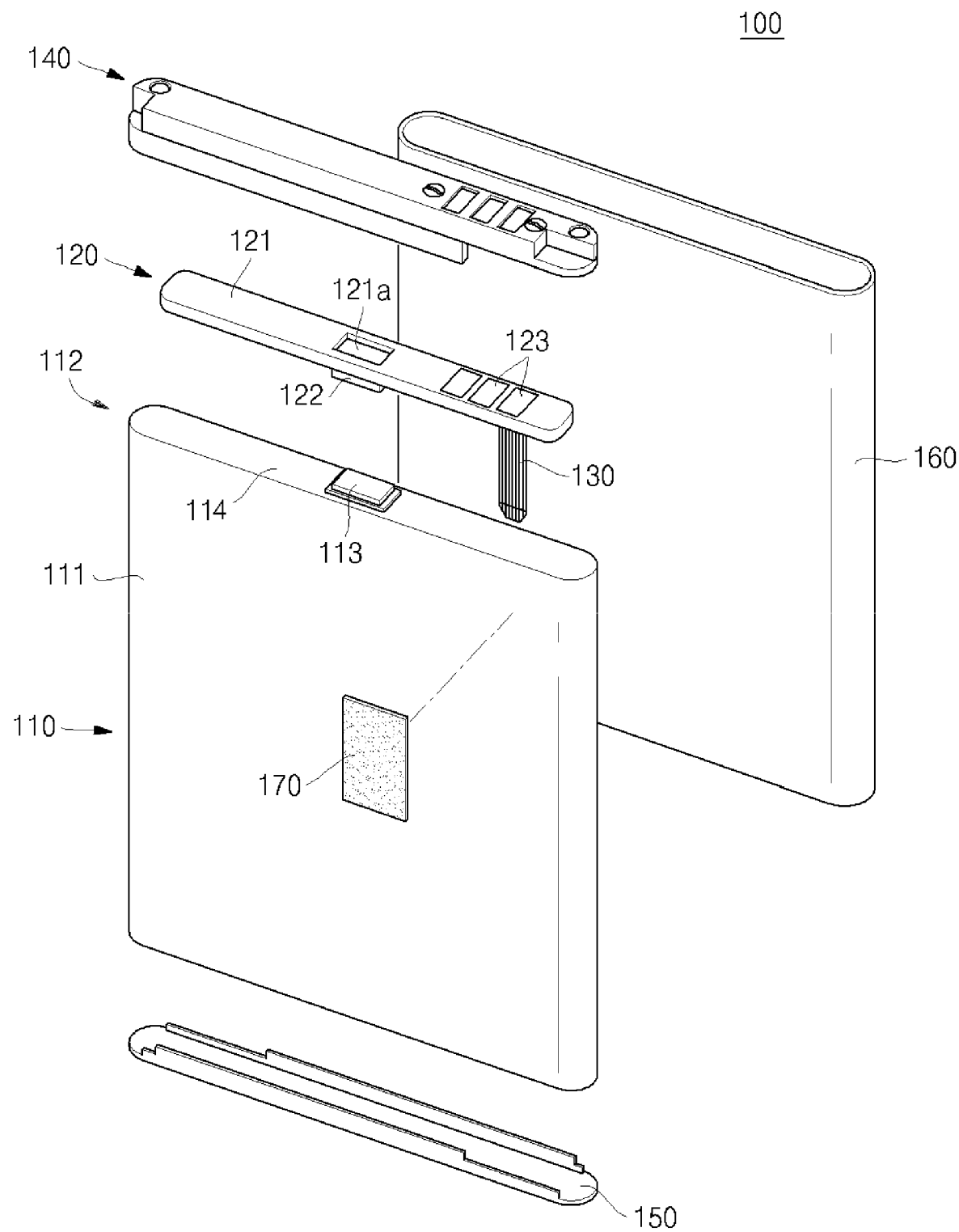
FIG. 1 is an exploded perspective view illustrating a battery pack, according to one exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. As referred to herein, when a first element is said to be disposed or formed "on", or "adjacent to", a second element, the first element can directly contact the second element, or can be separated from the second element by one or more other elements located therebetween. In contrast, when an element is referred to as being disposed or formed "directly on" another element, there are no intervening elements present. As used herein, the term "and/or" includes any and all combinations of one or more of the associated listed items.

Figure 2:
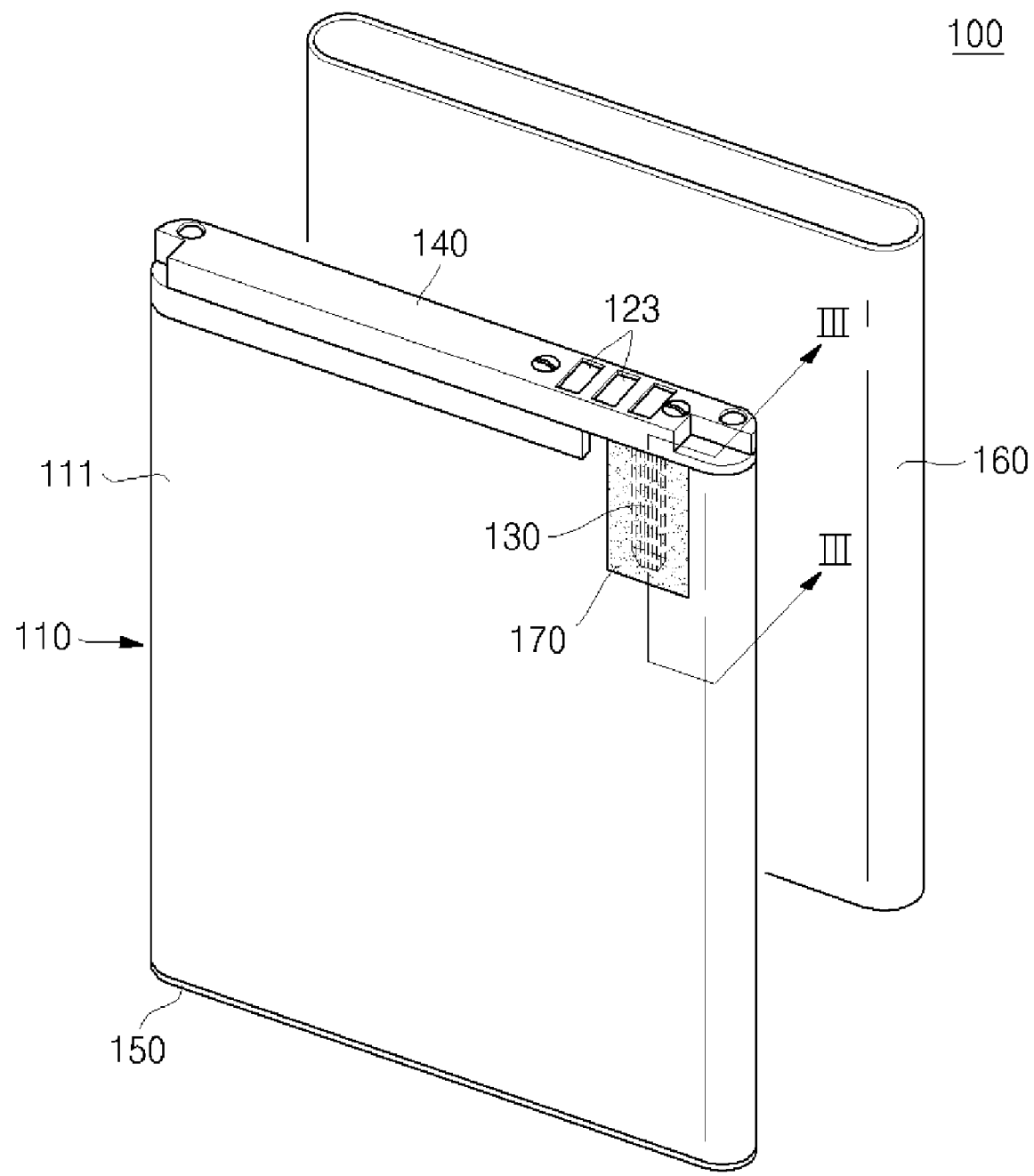
FIG. 2 is a perspective view illustrating the battery pack of FIG. 1, as assembled.
Figure 3:
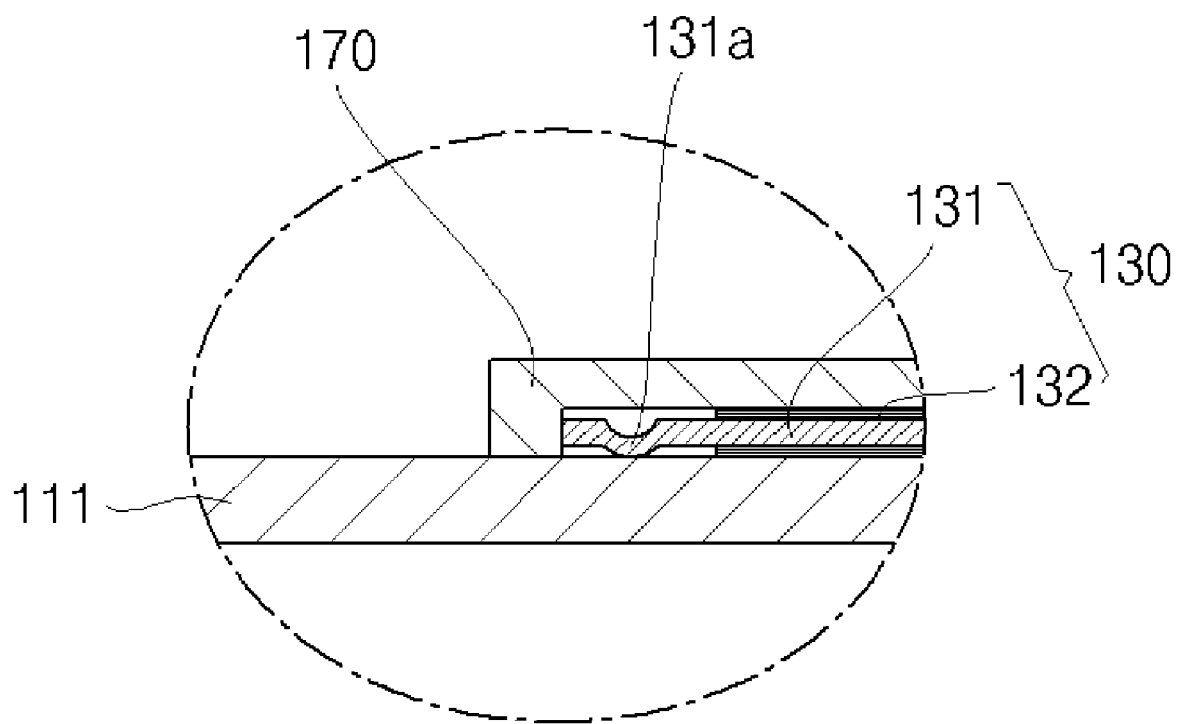
FIG. 3 is a sectional view taken along line 'III-III' of FIG. 2.

FIG. 1 is an exploded perspective view illustrating a battery pack, according to one exemplary embodiment of the present invention, and FIG. 2 is a perspective view illustrating the battery pack of FIG. 1, as assembled. FIG. 3 is a sectional view taken along line 'III-III' of FIG. 2.

Referring to FIGS. 1 to 3, a battery pack 100 includes a bare cell 110, a protection circuit module 120, and a flexible printed circuit board (FPCB) 130. The battery pack 100 further includes a top case 140, a bottom case 150, and a label 160.

The protection circuit module 120 is provided at a first side 112 of the can 111, where a first electrode terminal 113 projects from the bare cell 110. The protection circuit module 120 is connected to the first electrode terminal 113. The FPCB 130 is electrically connected to a second side of the can 111, which is a second electrode terminal of the bare cell 110, thereby electrically coupling the bare cell 110 to protection circuit module 120. The FPCB 130 is attached to the second side of the can 111, by an adhesive tape 170.

The bare cell 110 includes an electrode assembly (not shown) that is housed in the can 111. The bare cell 110 includes a cap assembly (not shown) to seal an opening of the can 111.

A first electrode of the bare cell 110 is electrically coupled to the cap assembly. A second electrode of the bare cell 110 is electrically coupled to the first electrode terminal 113, and insulated from the cap assembly. The first and second electrodes have different polarities.

The electrode assembly includes cathode and anode plates, and a separator interposed therebetween. The electrode assembly is generally wound into a jellyroll-type shape.

The can 111 is rectangular and can be formed by a deep drawing method. The can 111 may be made of conductive material, such as steel, stainless steel, aluminum (Al), or an aluminum alloy. Thus, the can 111 can be used as a terminal.

The can 111 contains the electrode assembly and electrolyte. The opening of the can 111 is sealed by the cap assembly.

The cap assembly includes a cap plate 114. The cap plate 114 has a through-hole, through which the first electrode terminal 113 extends. The first electrode terminal 113 is insulated from the cap plate 114. Accordingly, the cap plate 114 is used as a second electrode terminal.

The protection circuit module 120 includes a protection circuit board 121 and electrical elements (not shown) installed on the protection circuit board 121. An electrical terminal 122 corresponding to an anode is provided on the protection circuit board 121, and is exposed through a through-hole 121a formed in the middle thereof. External terminals 123 are provided at one side of an upper surface of the protection circuit board 121, and the FPCB 130 is electrically coupled to a lower surface thereof.

The FPCB 130 is formed by coating an insulating film 132 on a thin copper foil 131. The insulating film 132 can be polyimide, but is not limited thereto. The FPCB 130 is electrically coupled to the external terminal 123 of the protection circuit board 121. The FPCB 130 is also connected to the can 111, which is electrically connected to the bare cell 110.

The FPCB 130 is attached to the side of the can 111, by the adhesive tape 170. The adhesive tape 170 can be a polyimide tape. The adhesive tape 170 can be any suitable tape having excellent heat resistance, electrical insulation properties, and flexibility.

A leaf spring 131a is formed at an end of the copper foil 131, which is not coated by the insulating film 132. The leaf spring 131a is generally arc-shaped. The leaf spring 131a is fixed to the side surface of the can 111, by the adhesive tape 170. The adhesive tape 170 is attached to the side surface of the can 111 and is pressed against the leaf spring 131a, such that the adhesive tape 170 overcomes the elastic force of the leaf spring 131a. Thus, the adhesive tape 170 is not easily separated from the side surface of the can 111, even if an external impact is applied thereto.

Gold (Au) is plated on the uncoated end of the copper foil 131, where the copper foil 131 contacts the side surface of the can 111. The gold improves electrical conductivity and reduces corrosion.

A top case 140 is attached to the upper part of the bare cell 110, and the external terminals 123 are exposed through holes formed in the top case 140. The external terminals 123 are used to connect the battery pack 100 to an external device.

A bottom case 150 is attached to the lower part of the bare cell 110, to protect the bare cell from impacts. A label 160 is wound around the bare cell 110 and the FPCB 130, to help secure the FPCB 130 to the bare cell.

As described above, the FPCB 130 is attached to the side surface of the can 111 by the adhesive tape 170. However, the FPCB 130 may be attached by a conductive adhesive instead of the adhesive tape 170. The conductive adhesive attaches the FPCB 130 to the side of the can 111 and also electrically connects the can 111 to the FPCB 130.

The first electrode terminal 113 of the bare cell 110 is coupled to the electrical terminal 122, by spot welding, for example. The first electrode terminal 113 is also coupled to the protection circuit module 120. Accordingly, current can flow between the anode of the bare cell 110, the first electrode terminal 113, the protection circuit module 120, and an external device that is connected to the terminals 123.

The can 111 is electrically coupled to a cathode terminal (not shown) of the protection circuit module 120, by the FPCB 130. Accordingly, current can flow between the bare cell 110, the can 111, the FPCB 130, and the protection circuit module 120.

Figure 4:
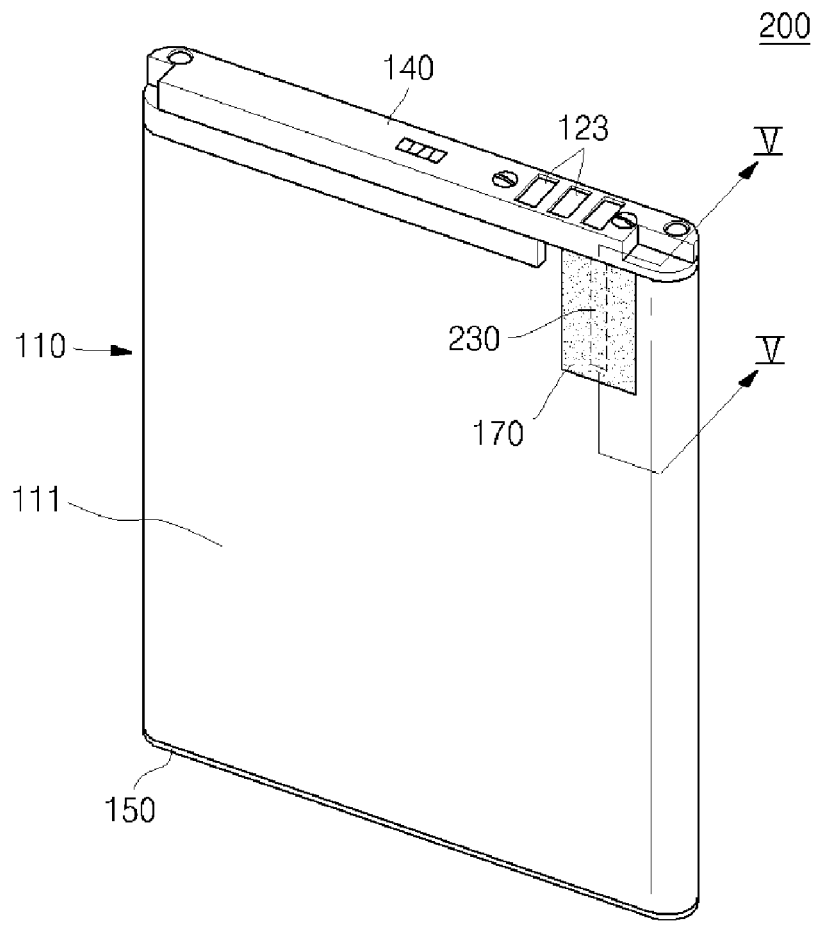
FIG. 4 is a perspective view illustrating a battery pack, according to another exemplary embodiment of the present invention.
Figure 5:
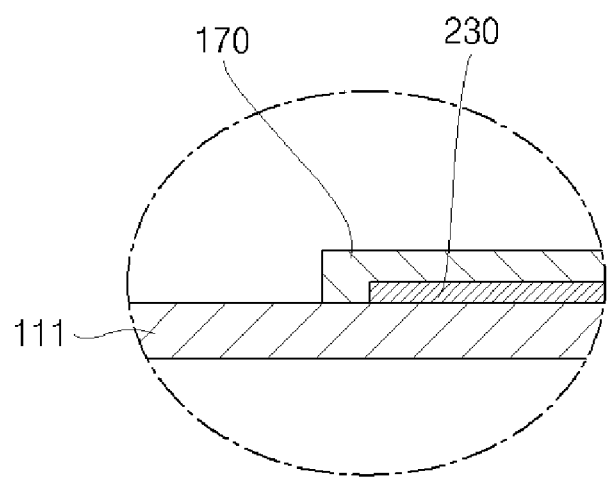
FIG. 5 is a sectional view taken along line 'V-V' of FIG. 4.

FIG. 4 is a perspective view illustrating a battery pack, according to another exemplary embodiment of the present invention, and FIG. 5 is a sectional view taken along line 'V-V' of FIG. 4. Referring to FIGS. 4 and 5, a battery pack 200 includes a bare cell 110, a protection circuit module (not shown), and a terminal plate 230. The battery pack 200 further includes a top case 140, a bottom case 150, and a label 160.

The protection circuit module 120 is disposed at a first side 112 of the can 111, where a first electrode terminal (not shown) of the bare cell 110 is exposed. The terminal plate 230 is attached to a second side of the can 111, by an adhesive tape 170. In other words, an electrical path is formed between the bare cell 110 and protection circuit module 120, by the terminal plate 230. The bare cell 110, protection circuit module 120, top case 140, bottom case 150, and label 160 are similar to those described above, and a detailed description thereof is omitted.

One end of the terminal plate 230 is electrically coupled to a cathode terminal (not shown) of the protection circuit module 120. In addition, the terminal plate 230 is attached to the second side of the can 111, which is used as the second electrode terminal of the bare cell 110. The terminal plate 230 is electrically connected to the second side of the can 111.

The terminal plate 230 can be made of a metal having excellent electrical conductivity and corrosion resistance, such as nickel (Ni), aluminum (Al), or copper (Cu). The can 111 can be made of aluminum, an aluminum alloy, or steel.

It is not easy to weld the terminal plate 230 to the can 111, when the terminal plate 230 is made of nickel and the can 111 is made of aluminum or an aluminum alloy. However, the can 111 and the terminal plate 230 can be coupled together without welding, by using the adhesive tape 170. When the terminal plate 230 is formed of aluminum, the can 111 is generally formed of aluminum or an aluminum alloy. When the terminal plate 230 is formed of copper, the can 111 is generally formed of steel or stainless steel.

As described above, the terminal plate 230 is attached to the second side of the can 111, by the adhesive tape 170. However, the terminal plate 230 may be attached by a conductive adhesive, instead of the adhesive tape 170. The conductive adhesive attaches the terminal plate 230 to the side surface of the can 111 and also provides an electrical connection between the can 111 and terminal plate 230.

The first electrode terminal 113 of the bare cell 110 is coupled to an electrical terminal 122 of the protection circuit module 120, by spot welding, for example. Accordingly, current can flow between the anode of the bare cell 110, the first electrode terminal 113, the electrical terminal 122, the protection circuit module 120, and one of the electrical terminals 122.

The can 111, which is used as the second electrode terminal of the bare cell 110, is electrically coupled to a cathode terminal (not shown) of the protection circuit module 120, by the terminal plate 230. Accordingly, current can flow between the cathode of the bare cell 110, the can 111, the terminal plate 230, the protection circuit module 120, and one of the external terminals 123.

Figure 6:
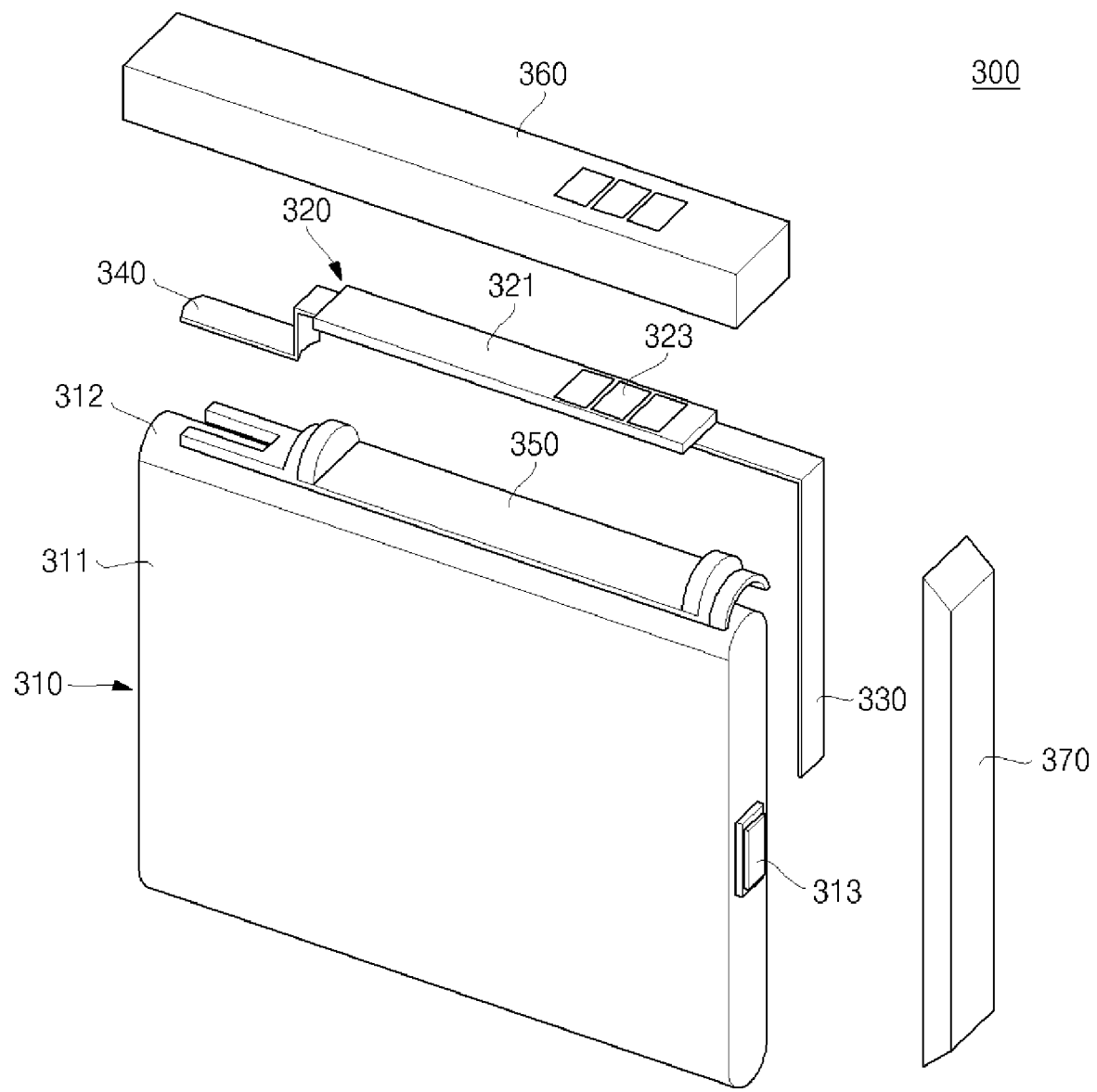
FIG. 6 is a perspective view illustrating a battery pack, according to a still another exemplary embodiment of the present invention.
Figure 7:
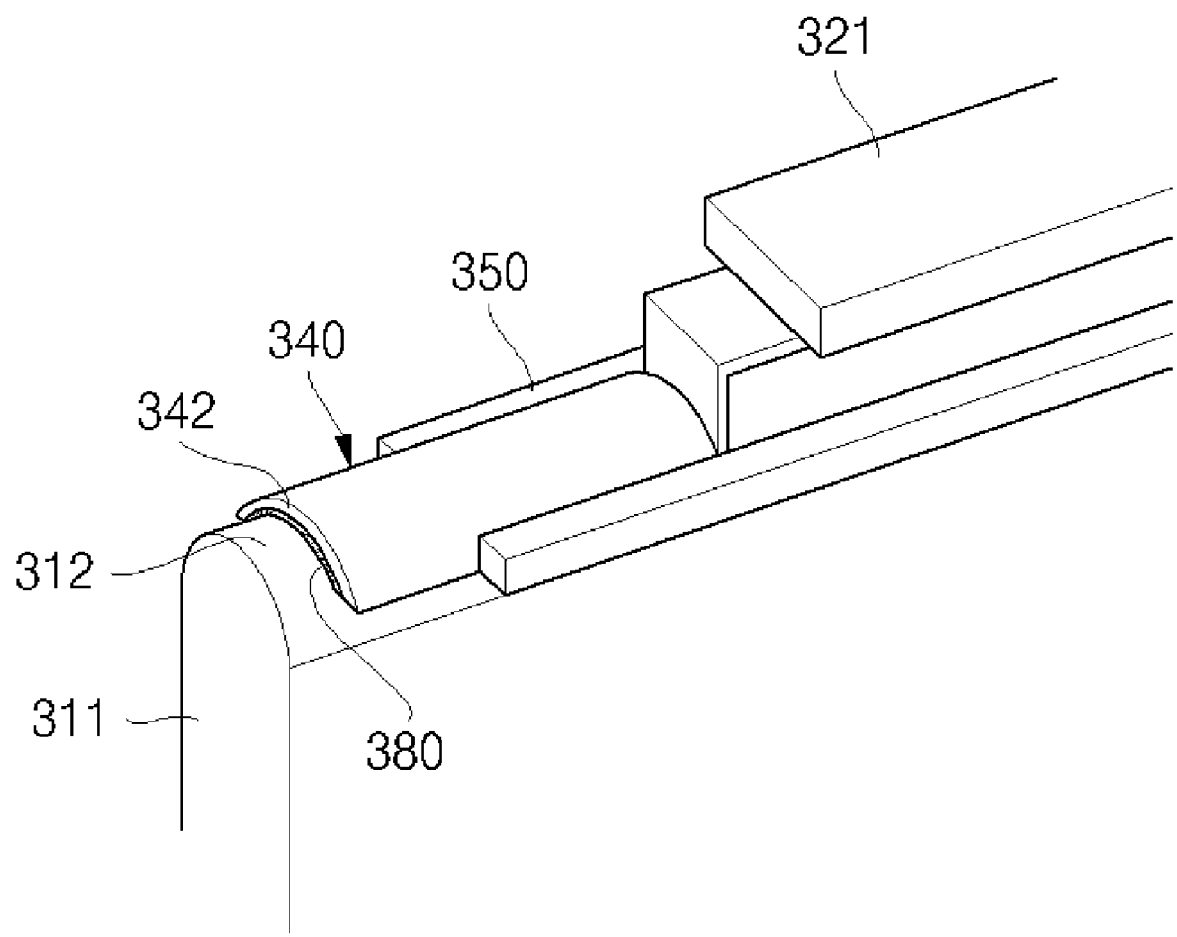
FIG. 7 is a perspective view illustrating the battery pack of FIG. 6, as assembled.

FIG. 6 is a perspective view illustrating a battery pack, according to a still another exemplary embodiment of the present invention, and FIG. 7 is a perspective view illustrating the battery pack of FIG. 6, as assembled. Referring to FIGS. 6 and 7, a battery pack 300 includes a bare cell 310, a protection circuit module 320, and first and second terminal plates 330 and 340. The battery pack 300 further includes a substrate holder 350, and first and second cases 360 and 370.

The protection circuit module 320 is provided at a first side 312 of the can 311, where a first electrode terminal 313 of the bare cell 310 is not exposed. The protection circuit module 320 is coupled to the first electrode terminal 313, by the first terminal plate 330.

The protection circuit module 320 is connected to a second side of the can 311, by the second terminal plate 340. The second terminal plate 340 is attached to the first side 312 of the can 311, by a conductive adhesive 380. The bare cell 310 and protection circuit module 320 similar to those described above, and a detailed description thereof, is omitted.

The first terminal plate 330 extends from a first end of a protection circuit board 321 of the protection circuit module 320, and is bent toward the first electrode terminal 313. The first terminal plate 330 is connected to the first electrode terminal 313, by resistance welding, for example.

The second terminal plate 340 extends from a second end of the protection circuit board 321 and is bent to contact the first side 312 of the can 311. The second terminal plate 340 is attached to the first side 312, by the conductive adhesive 380.

The second terminal plate 340 is curved to conform to the shape of the first side 312 of the can 311. Accordingly, the first side 312 and the second terminal plate 340 generally have the same curvature.

The terminal plate 340 and the can 311 can be made of the same materials as the terminal plate 230 and the can 111. It is not easy to weld the terminal plate 340 to the can 311, when the terminal plate 340 is made of nickel and the can 111 is made of aluminum or an aluminum alloy. However, the can 311 and the terminal plate 340 can be coupled together without welding, by using the conductive adhesive 380.

A conductive material may be plated on the second terminal plate 340, where the second terminal plate 340 contacts the can 111. The conductive adhesive 380 is not limited to a particular type of conductive adhesive. The conductive adhesive 380 generally has a short curing time, is highly heat conductive, and has a good heat resistance.

The conductive adhesive 380 may include an thermosetting epoxy or a thermoplastic adhesive. A thermosetting binder, such as epoxy resin, can be used as the thermosetting adhesive. The thermoplastic adhesive generally discharges little gas and ion impurities, and can be reused by heat treatment. The conductive adhesive 380 generally provides excellent boding performance and a high electrical conductivity, between the bare cell 110 and terminal plate 230.

The substrate holder 350 is provided to stably seat the protection circuit module 320 on the first side 312 of the bare cell 310. The protection circuit module 320 is attached to the bare cell 310 by the first case 360. The second case 370 is attached to an second side of the bare cell 110, to protect the first electrode terminal 313 and the first terminal plate 330.

The terminal plate 230 is attached to the can 111 by the conductive adhesive 380, but not limited thereto. The terminal plate 230 may be attached by ab adhesive tape, for example.

The first electrode terminal 313 is coupled to the first terminal plate 330. Accordingly, current flows between the anode of the bare cell 310, the first electrode terminal 313, the first terminal plate 330, the protection circuit module 320, and one of the external terminals 323.

The can 311 is electrically coupled to a cathode terminal (not shown) of the protection circuit module 320, by the second terminal plate 340. Accordingly, current flows between the cathode of the bare cell 310, the can 311, the second terminal plate 340, the protection circuit module 320, and one of the external terminals 323.

As described above, a battery pack, according to aspects of the present invention, produces the following and/or other effects. A welding process, for electrically coupling the bare cell to the protection circuit module, can be omitted, to reduce work time and to prevent welding process defects. Harmful materials, such as palladium, or mercury, can be avoided, to improve reliability.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A battery pack comprising:
   a bare cell comprising a can;
   a protection circuit module;
   a flexible printed circuit board electrically connecting the protection circuit module to the bare cell, the flexible printed circuit board comprising a copper foil and an insulating film coated on a portion of the copper foil electrically insulating the copper foil, wherein a non-insulated portion of the copper foil comprises a leaf spring that is electrically connected to the can; and
   an adhesive unit to attach the flexible printed circuit board to the bare cell.

2. The battery pack of claim 1, wherein:
   the can is a rectangular shape;
   the protection circuit module is attached to a first side of the can, and is electrically connected to a first electrode terminal of the bare cell, which extends through the first side of the can; and
   the flexible printed circuit board is attached to the protection circuit module and to a second side of the can.

3. The battery pack of claim 2, wherein the second side of the can is electrically connected to a second electrode terminal of the bare cell.

4. The battery pack of claim 1, wherein the non-insulated portion is plated with gold.

5. The battery pack of claim 2, wherein:
   the can comprises aluminum or an aluminum alloy.

6. The battery pack of claim 2, wherein:
   the can comprises steel.

7. The battery pack of claim 1, wherein:
   the can is a roughly rectangular shape;
   the protection circuit module is disposed on a first side of the can;
   a first electrode terminal of the bare cell extends through a second side of the can; and
   the flexible printed circuit board electrically connects the protective circuit module to the first side of the can and electrically connects the protective circuit module to the first electrode terminal.

8. The battery pack of claim 7, wherein the first side of the can is electrically connected to a second electrode terminal of the bare cell.

9. The battery pack of claim 1, wherein the adhesive unit comprises a conductive adhesive disposed between the flexible printed circuit board and the bare cell.

10. The battery pack of claim 1, wherein the adhesive unit comprises an adhesive tape covering the flexible printed circuit board.

11. The battery pack of claim 10, wherein the adhesive tape is a polyimide tape.

12. The battery pack of claim 1, further comprising a top case to cover the protection circuit module.

13. The battery pack of claim 1, further comprising a label disposed around the bare cell and the flexible printed circuit board.

14. The battery pack of claim 1, further comprising a bottom case to cover a second side of the bare cell, which opposes the first side of the bare cell.

* * * * *